United States Patent
O'Carroll

(10) Patent No.: US 6,772,165 B2
(45) Date of Patent: Aug. 3, 2004

(54) ELECTRONIC DOCUMENT PROCESSING SYSTEM AND METHOD FOR MERGING SOURCE DOCUMENTS ON A NODE-BY-NODE BASIS TO GENERATE A TARGET DOCUMENT

(76) Inventor: Garrett O'Carroll, 108 Balally Drive, Dundrum, Dublin 16 (IE)

( * ) Notice: Subject to any disclaimer, the term of this patent is extended or adjusted under 35 U.S.C. 154(b) by 0 days.

(21) Appl. No.: 10/294,591

(22) Filed: Nov. 15, 2002

(65) Prior Publication Data

US 2003/0093755 A1 May 15, 2003

Related U.S. Application Data

(63) Continuation of application No. PCT/IE01/00068, filed on May 15, 2001.

(30) Foreign Application Priority Data

May 16, 2000 (IE) ................................ S000377
Nov. 21, 2000 (IE) ................................ S000942

(51) Int. Cl.[7] .......................................... G06F 17/30
(52) U.S. Cl. ....................... 707/101; 707/6; 707/7; 715/500.1; 715/501.1; 715/511; 715/514; 715/515
(58) Field of Search ............... 707/6, 7, 100, 707/101, 104.1; 715/500.1, 501.1, 511, 514, 515

(56) References Cited

U.S. PATENT DOCUMENTS

| | | | |
|---|---|---|---|
| 4,674,040 A | * | 6/1987 | Barker et al. ............... 707/200 |
| 5,890,171 A | | 3/1999 | Blumer et al. .............. 707/501 |
| 5,890,177 A | * | 3/1999 | Moody et al. .............. 715/511 |
| 5,915,259 A | * | 6/1999 | Murata ....................... 715/513 |
| 5,956,726 A | * | 9/1999 | Aoyama et al. ............ 707/102 |
| 6,016,494 A | | 1/2000 | Isensee et al. ............. 707/102 |
| 6,249,291 B1 | * | 6/2001 | Popp et al. ................. 345/473 |
| 6,418,446 B1 | * | 7/2002 | Lection et al. ........ 707/103 R |
| 6,502,112 B1 | * | 12/2002 | Baisley ....................... 715/513 |
| 6,507,856 B1 | * | 1/2003 | Chen et al. ................. 715/513 |
| 2001/0018697 A1 | * | 8/2001 | Kunitake et al. ........... 707/517 |
| 2002/0188598 A1 | * | 12/2002 | Myllymaki .................... 707/2 |
| 2003/0028561 A1 | * | 2/2003 | Gounares et al. .......... 707/513 |

OTHER PUBLICATIONS

Morrison, Michael, "XML Unleashed", Sams Publishing, Dec. 21, 1999, pp.: 992.*
Muench, Steve, "Building Oracle XML Application", O'Reilly Publishing, Sep. 2000, pp.: 810.*
Clark, James, "XSL Transformations (XSTL) version 1.0", W3C Recommendation Nov. 16, 1999, pp.: 124.*
Marsh et al., XML Inclusion (XInclude), W3c working draft, Mar. 22, 2000. pp.: 21.*

* cited by examiner

Primary Examiner—Srirama Channavajjala
Assistant Examiner—Khanh Pham
(74) Attorney, Agent, or Firm—Jacobson Holman PLLC

(57) ABSTRACT

A target document (25) is generated by merging four source documents (2–5). There are three merge operations, an operation (10) for two source documents (2, 13), an operation (13) for an intermediate target document and a source document (4), and an operation (21) for a second intermediate target document and a final source document (5). In each merge operation one source document inherits from the other. An inheriting instruction is embedded within the inheriting document. Merging is performed by parsing a document (6, 8, 11, 20) into a hierarchical tree if it is not already in that form, and merging the trees. Matching nodes are identified and are combined or replaced according to a policy.

17 Claims, 15 Drawing Sheets file child.html

```
<html extends="parent.html" >
<head >
<title id="title" > the child </title>

<style>
    body {font-size:12pt}
</style>
</head>

<body >

<div id="buttonBar" extends="buttons.html"/>
<div id="mainInsert"><img src="//babel/genx/invoice.jpg" /></div>
<div id="skinSelect" extends="skins.html" >
    <A id="no_skin" href="http://babel/servlet/DXe/test3.html?extends=" value="" >No skin</A>
</div>
</body>
</html>
```

Fig. 2(a)

```
file "skins.html"
<div id="skinSelect" >
<A id="skin_a" href="http://babel/servlet/DXe/test3.html?extends=test3_a_parent.html" value="test3_a_parent.html">skin-A</A>
<A id="skin_b" href="http://babel/servlet/DXe/test3.html?extends=test3_b_parent.html" value="test3_b_parent.html">skin-B</A>
<A id="skin_c" href="http://babel/servlet/DXe/test3.html?extends=test3_c_parent.html" value="test3_c_parent.html">skin-C</A>
<A id="skin_d" href="http://babel/servlet/DXe/test3.html?extends=test3_d_parent.html" value="test3_d_parent.html">skin-D</A>
<A id="skin_e" href="http://babel/servlet/DXe/test3.html?extends=test3_e_parent.html" value="test3_e_parent.html">skin-E</A>
<A id="skin_f" href="http://babel/servlet/DXe/test3.html?extends=test3_f_parent.html" value="test3_f_parent.html">skin-F</A>
<A id="skin_g" href="http://babel/servlet/DXe/test3.html?extends=test3_g_parent.html" value="test3_g_parent.html">skin-G</A>
<A id="skin_h" href="http://babel/servlet/DXe/test3.html?extends=test3_h_parent.html" value="test3_h_parent.html">skin-H</A>
<A id="skin_i" href="http://babel/servlet/DXe/test3.html?extends=test3_i_parent.html" value="test3_i_parent.html">skin-I</A>
<A id="skin_j" href="http://babel/servlet/DXe/test3.html?extends=test3_j_parent.html" value="test3_j_parent.html">skin-J</A>
<A id="skin_k" href="http://babel/servlet/DXe/test3.html?extends=test3_k_parent.html" value="test3_k_parent.html">skin-K</A>
</div>
```

Fig. 4(a)

file parent.html

```
<html  >
 <head >
 <style id="style">
 p {font-size:10pt}
 </style>
 </head>
<body  >
<table border="1" cellpadding="0" cellspacing="0" style="background-image:url(//babel/genx/marble.jpg)"  >
<tr >
<td id="mainInsert" > </td>
</tr>
<tr>
<td colspan="2" id="buttonBar"  >
<a href="action6"  ><img src="//babel/genx/icons/actn006.gif"  /></a>
<a href="action7"  ><img src="//babel/genx/icons/actn007.gif"  /></a>
<a href="action8"  ><img src="//babel/genx/icons/actn008.gif"  /></a>
<a href="action9"  ><img src="//babel/genx/icons/actn009.gif"  /></a>
<a href="action10"  ><img src="//babel/genx/icons/actn010.gif"  /></a>
</td>
</tr>
</table>
</body>
</html>
```

25 html produced by inheritance

```
<html id="dxe.html" extends="parent.html" >
  <head id="dxe.html.head" >
    <title > the child </title>
    <style id="style" >
      p {font-size:10pt}
      body {font-size:12pt}
    </style>
  </head>
  <body id="dxe.html.body" >
    <table border="1" cellpadding="0" cellspacing="0" style="background-image:url(//babel/genx/marble.jpg)" >
      <tr >
        <td id="mainInsert" > <img src="//babel/genx/invoice.jpg" /></td>
      </tr>
      <tr >
        <td colspan="2" id="buttonBar" extends="buttons.html" >
          <a href="action6" ><img src="//babel/genx/icons/actn006.gif" /></a>
          <a href="action7" ><img src="//babel/genx/icons/actn007.gif" /></a>
          <a href="action8" ><img src="//babel/genx/icons/actn008.gif" /></a>
          <a href="action9" ><img src="//babel/genx/icons/actn009.gif" /></a>
          <a href="action10" ><img src="//babel/genx/icons/actn010.gif" /></a>
          <a href="action1" ><IMG src="//babel/genx/icons/actn001.gif" /></a>
          <a href="action2" ><IMG src="//babel/genx/icons/actn002.gif" /></a>
          <a href="action3" ><IMG src="//babel/genx/icons/actn003.gif" /></a>
          <a href="action4" ><IMG src="//babel/genx/icons/actn004.gif" /></a>
          <a href="action5" ><IMG src="//babel/genx/icons/actn005.gif" /></a>
        </td>
      </tr>
    </table>
    <div id="skinSelect" extends="skins.html" >
      <a id="skin_a" href="http://babel/servlet/DXe/test3.html?extends=test3_a_parent.html" value="test3_a_parent.html" >skin-A</a>
      <a id="skin_b" href="http://babel/servlet/DXe/test3.html?extends=test3_b_parent.html" value="test3_b_parent.html" >skin-B</a>
      <a id="skin_c" href="http://babel/servlet/DXe/test3.html?extends=test3_c_parent.html" value="test3_c_parent.html" >skin-C</a>
      <a id="skin_d" href="http://babel/servlet/DXe/test3.html?extends=test3_d_parent.html" value="test3_d_parent.html" >skin-D</a>
      <a id="skin_e" href="http://babel/servlet/DXe/test3.html?extends=test3_e_parent.html" value="test3_e_parent.html" >skin-E</a>
      <a id="skin_f" href="http://babel/servlet/DXe/test3.html?extends=test3_f_parent.html" value="test3_f_parent.html" >skin-F</a>
      <a id="skin_g" href="http://babel/servlet/DXe/test3.html?extends=test3_g_parent.html" value="test3_g_parent.html" >skin-G</a>
      <a id="skin_h" href="http://babel/servlet/DXe/test3.html?extends=test3_h_parent.html" value="test3_h_parent.html" >skin-H</a>
      <a id="skin_i" href="http://babel/servlet/DXe/test3.html?extends=test3_i_parent.html" value="test3_i_parent.html" >skin-I</a>
      <a id="skin_j" href="http://babel/servlet/DXe/test3.html?extends=test3_j_parent.html" value="test3_j_parent.html" >skin-J</a>
      <a id="skin_k" href="http://babel/servlet/DXe/test3.html?extends=test3_k_parent.html" value="test3_k_parent.html" >skin-K</a>
      <a id="no_skin" href="" value="" >No skin</a>
    </div>
  </body>
</html>
```

ELECTRONIC DOCUMENT PROCESSING SYSTEM AND METHOD FOR MERGING SOURCE DOCUMENTS ON A NODE-BY-NODE BASIS TO GENERATE A TARGET DOCUMENT

This is a continuation of PCT/IE01/00068 filed May 15, 2001 and published in English.

FIELD OF THE INVENTION

The invention relates to processing of electronic documents, and more particularly to generation of a target document from a source document. In this specification, and in document-handling terminology generally, the term "element" means a node or tree of nodes within a document or the full document.

PRIOR ART DISCUSSION

The most common form of electronic document processing is the operation of a Web server to provide HTML documents to browsers via HTTP. However, various mark-up languages are also used for publication of documents, via the Web or otherwise. They generally have a hierarchical structure of elements. The structure is generally defined by tags (sequences of characters in the document).

In recent years electronic documents have been developed further. For example, Java Server Pages (JSP) contain both HTML markup content and Java programming code. Processing of such a document typically involves executing the Java code, often to generate text. The Java code is replaced by the text it generates, and the resulting HTML page is sent to the browser. In another example, the source document is a word processing template having fields for entry of data. The fields are in a fixed structure and data can only be entered at the fixed field locations.

Thus, to date the processing of source documents has been limited by the fixed locations for changing/adding content. Another limitation is that the processing is governed by the meaning of the information in the source document. For example, in JSPs the processing is governed by the Java code, and in the word processing template only dates can be inserted in date fields.

Therefore, it is an objective of the invention to provide for more versatility in which documents are processed. Another objective is that the processing does not require knowledge of the meaning or structure of the information in the source document.

SUMMARY OF THE INVENTION

According to the invention, there is provided a document processing system comprising means for processing a source document to provide a target document, characterised in that the processing means comprises means for merging the source document with at least one other source document to provide the target document.

In one embodiment, the merge means comprises means for merging source document hierarchical structure node trees into a single target tree for the target document.

In another embodiment, the merge means comprises means for identifying matching source nodes in source trees, for inserting a single node in the target tree corresponding to the matching nodes, and for inserting other nodes in the target tree with reference to said single node.

In one embodiment the merge means comprises means for always treating root source nodes as matching nodes.

In another embodiment, the merge means comprises means for treating a source tree as having a fixed role and the other source tree as having a movable role, in which the structure of the source tree having the fixed role is preserved and the structure of the source tree having the movable role may be changed.

In one embodiment, the merge means comprises means for (a) placing only one of a pair of matching nodes in the target tree, or for (b) combining the matching nodes to generate a composite node, and the selection of (a) or (b) is according to a policy.

In another embodiment, (b) is a default policy.

In one embodiment, the merge means comprises means for adding a non-matching node of a movable role tree to the target tree as a child of the node that represents its parent from the movable role tree.

In one embodiment, the merge means comprises means for placing said non-matching node after child nodes of a matching node in the fixed tree if the parent of said non-matching node is a matching node.

In another embodiment, the merge means comprises means for handling a node having more than one ancestor matching node by placing it relative to the nearest ancestor matching node.

In a further embodiment, the merge means comprises means for preserving the order of non-matching nodes of the movable role source tree unless modified by the presence of a matching node.

In one embodiment, the merge means comprises means for operating according to a lookup policy in which the movable role source tree is treated as a resource from which nodes are selectively chosen for merging.

In another embodiment, the merge means comprises means for recognising a placeholder node in the fixed role tree and for placing a set of nodes of the movable role source tree in the target tree in lieu of the placeholder node.

In one embodiment the merge means comprises means for activating merging in response to an inheriting source document indicating that it should inherit content from an inherited source document.

In another embodiment, the merge means comprises means for determining that the inheriting source document requests inheritance by reading a flag indicating such.

In a further embodiment, the merge means comprises means for reading said flag from within the inheriting document.

In a still further embodiment, the merge means comprises means for recognising a flag indicating required inheritance from a plurality of inherited documents, and for merging the inheriting and the plural inherited documents.

In one embodiment, the merge means comprises means for successively merging pairs of documents in a nested manner until all source documents have been merged.

In another embodiment, the merge means comprises means for merging partial documents.

In one embodiment, the merge means comprises means for operating according to merge instructions dynamically generated from a rule using current parameter values.

In a further embodiment, the processing means comprises means for parsing a source document to generate the source tree.

In a still further embodiment, the processing means comprises means for rendering the target tree to provide the target document.

According to another aspect, the invention provides a document processing system comprising means for processing a source document to provide a target document, characterised in that, the processing means comprises:

means for parsing a source document into a source tree comprising a hierarchical structure of nodes according to a block structure of the document;

means for merging source trees of at least two source documents to provide a target tree of a target document in which:- matching nodes of different source trees are identified, a single node corresponding to a pair of matching nodes is placed in the target tree, other nodes are placed in the target tree with reference to said single node, one source tree is treated as having a movable role and another as having a fixed role, and the order of non-matching nodes of the movable role source tree is preserved unless modified by the presence of a matching node, the merge means comprises means for adding a non-matching node of a movable role tree to the target tree as a child of the node that represents its parent from the movable role tree, the merge means comprises means for placing said non-matching node after child nodes of a matching node in the fixed tree if the parent of said non-matching node is a matching node, and the merge means comprises means for handling a node having more than one ancestor matching node by placing it relative to the nearest ancestor matching node;

the processing means comprises means for rendering the target tree to provide the target document.

In another aspect, the invention provides a method of processing a source document to provide a target document, the method being carried out by a data processing system and the documents are in the electronic form, characterised in that the source document is merged with at least one other source document to provide the target document.

In one embodiment the method merges the source documents by:

parsing the source documents to generate source trees comprising hierarchical structures of nodes;

merging the source trees to provide a target tree; and rendering the target tree to provide the target document.

In one embodiment, the merging step comprises:- identifying matching nodes (X, Y, Z) in at least two source trees;

inserting a single node corresponding to the matching nodes in the target tree;

placing other nodes in the target tree with reference to said single node.

In one embodiment, the single node is either (a) one of the matching nodes or (b) a composite node of the matching nodes, and choice of (a) or (b) is according to a configurable policy.

In another embodiment, merging is initiated by a flag embedded in a source document indicating that it should inherit content from at least one other source document.

In one embodiment, wherein a source document is treated as having a fixed role and another source document is treated as having a movable role, in which the structure of the fixed role source tree is preserved and the structure of the movable role source tree may be changed.

In another embodiment, each of said source documents comprises a separate strand of associated content, and the method is performed to combine said strands of content in a single target document.

In one embodiment, a source document is the output of a database query, and the method merges said result with another source document.

In another embodiment, a node of said other source document is merged with multiple nodes of said query result source document.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:-

FIG. 6(a) is another source document.

DESCRIPTION OF THE EMBODIMENTS

Figure 1:
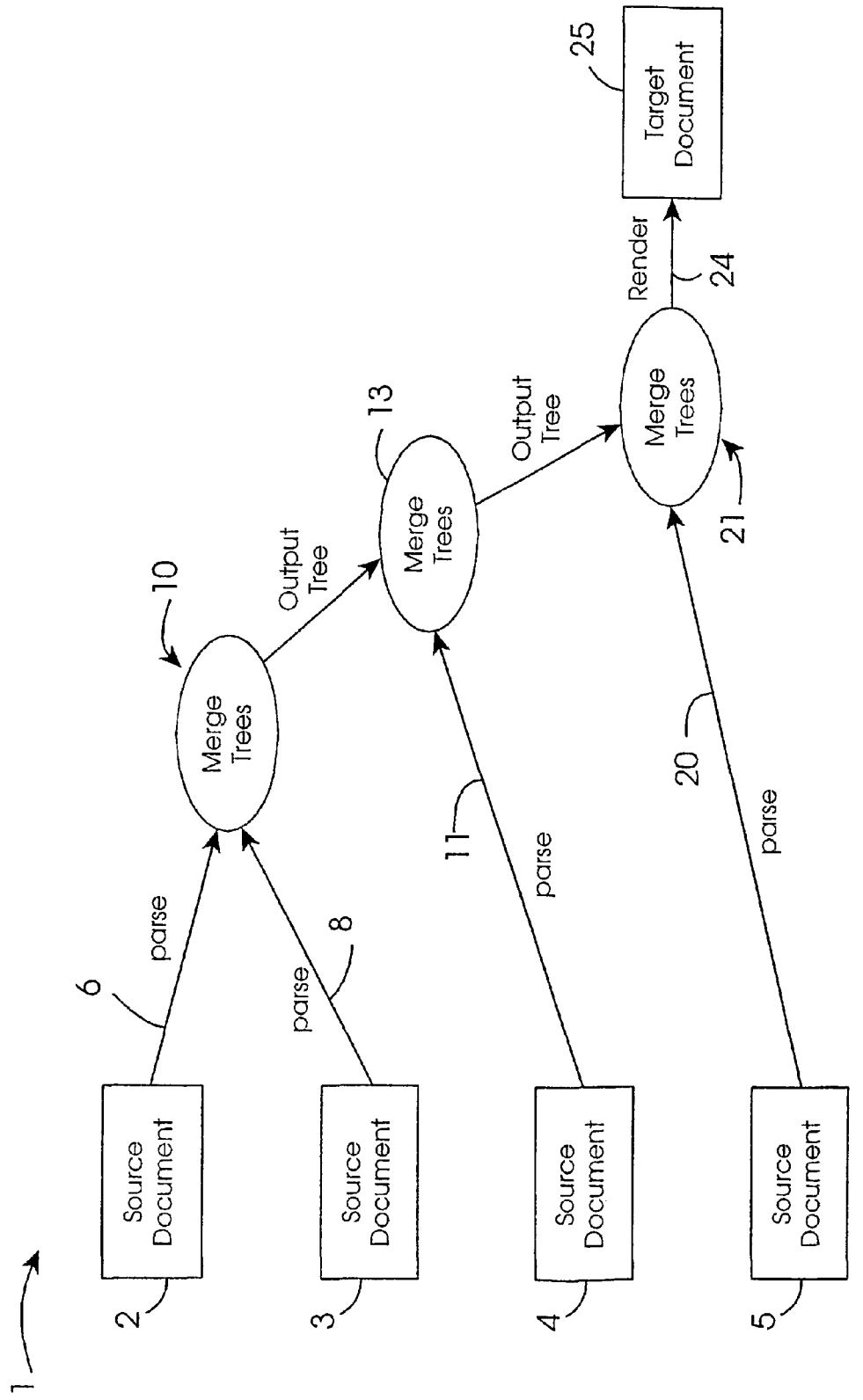
FIG. 1 is a flow diagram illustrating a document processing method of the invention.

Referring to FIG. 1 a document processing method 1 is carried out with four source documents as follows:

HTML document 2, called "child.html",

HTML document 3, called "buttons.html",

HTML document 4, called "skins.html", and

HTML document 5, called "parent.html".

The child.html document 2 is referred to generally as an "inheriting" document because it has flags embedded within it which indicate that it should inherit content from at least one other source document. For clarity the latter is referred to generally as an "inherited" source document. The tags in this embodiment are the strings "extends=" followed by the names/specifications of the relevant inherited documents. Referring to FIG. 2(a) the document 2 has flags to inherit content from all of the other source documents 3, 4, and 5.

Figure 2B:
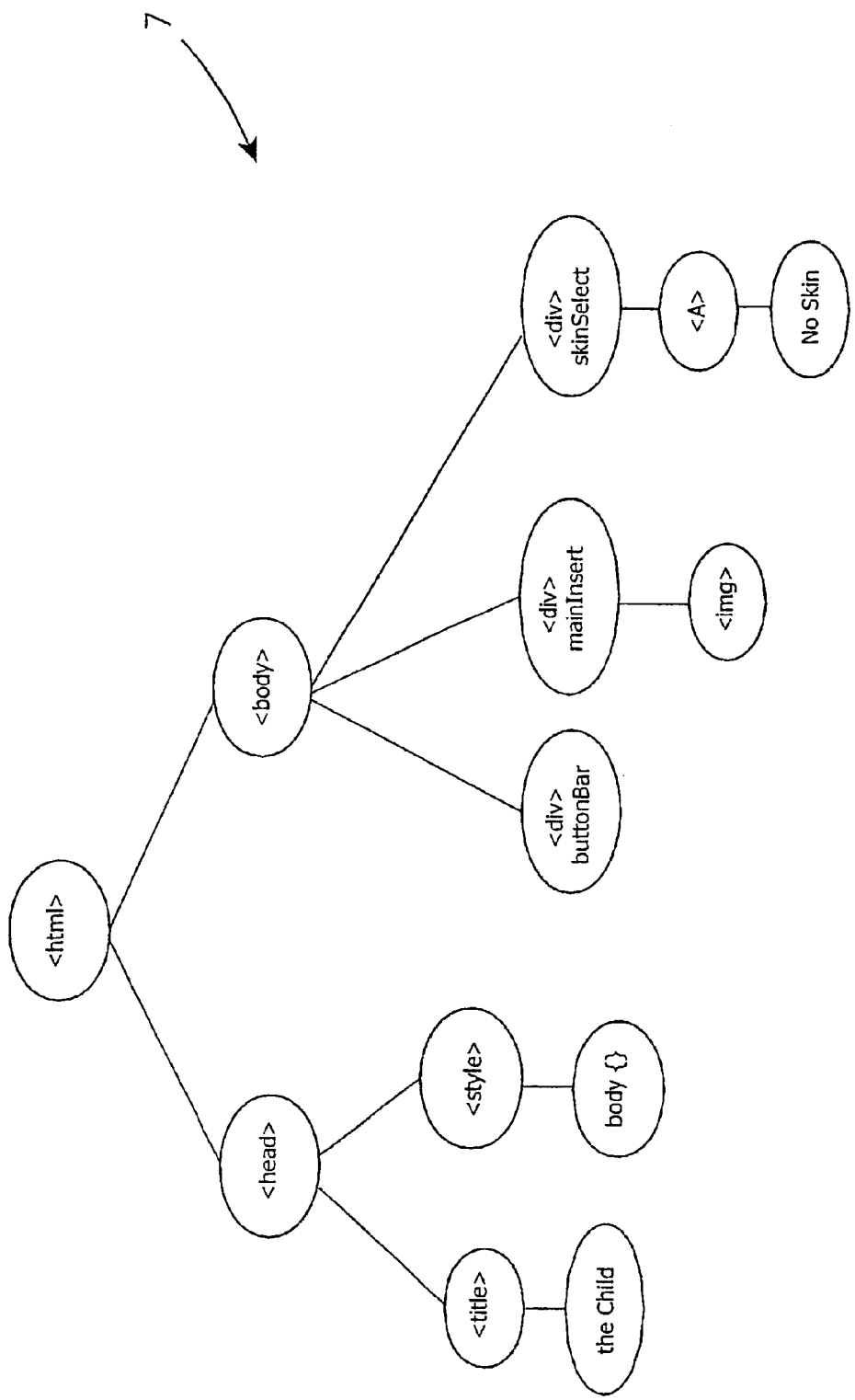
FIGS. 2(a), 3(a), and 4(a) are source documents and 2(b), 3(b), and 4(b) are trees representing these documents respectively.

The method 1 comprises a parsing step 6 in which the syntax of the source document 2 is parsed to generate a hierarchical structure tree 7 of nodes, shown in FIG. 2(b). As is clear from this diagram the header <html> is a root node and dependent nodes are <head> and <body>. Nodes subsidiary to these include <title>, <div> mainInsert, and <div> skinSelect.

Figure 3A:
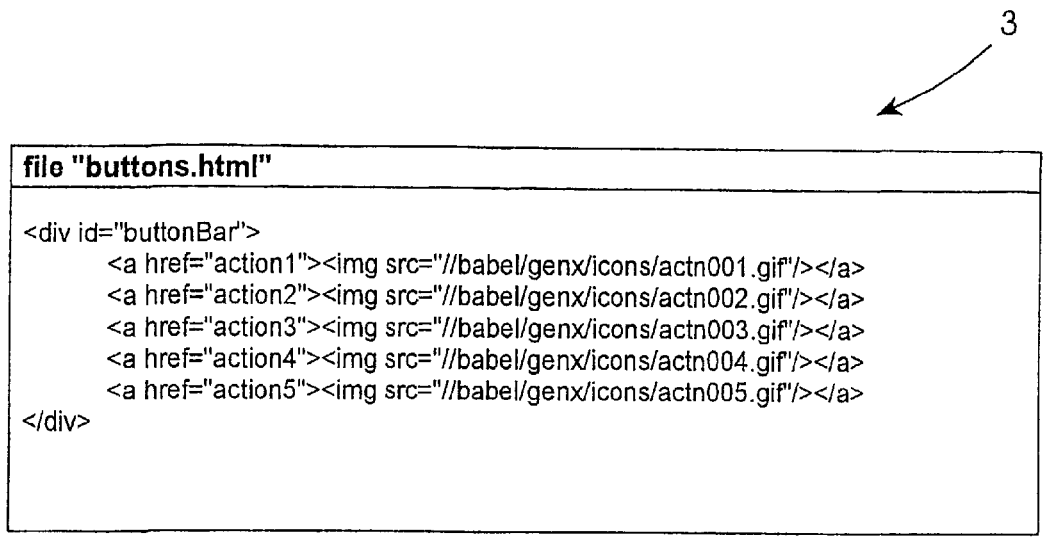
Figure 3B:
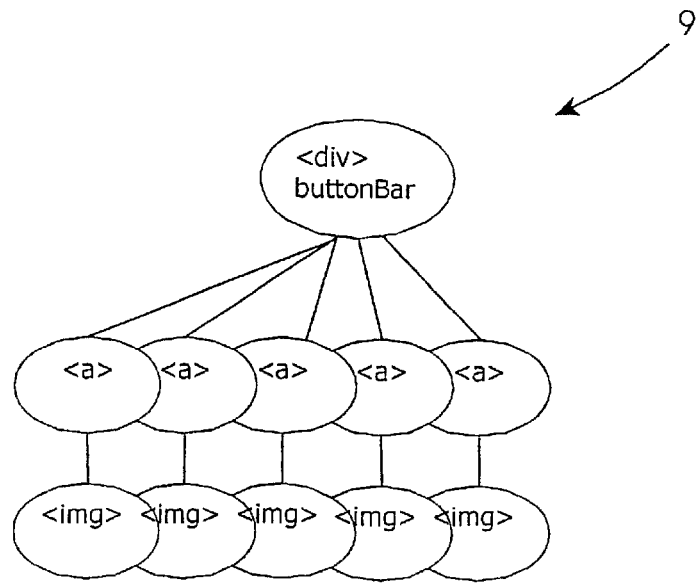

Likewise, the source document 3, shown in FIG. 3(a) is parsed in step 8 to provide a tree 9 shown in FIG. 3(b). The trees 7 and 9 are merged in a step 10 to provide a first intermediate target tree, not shown. This tree is only processed internally.

Figure 4B:
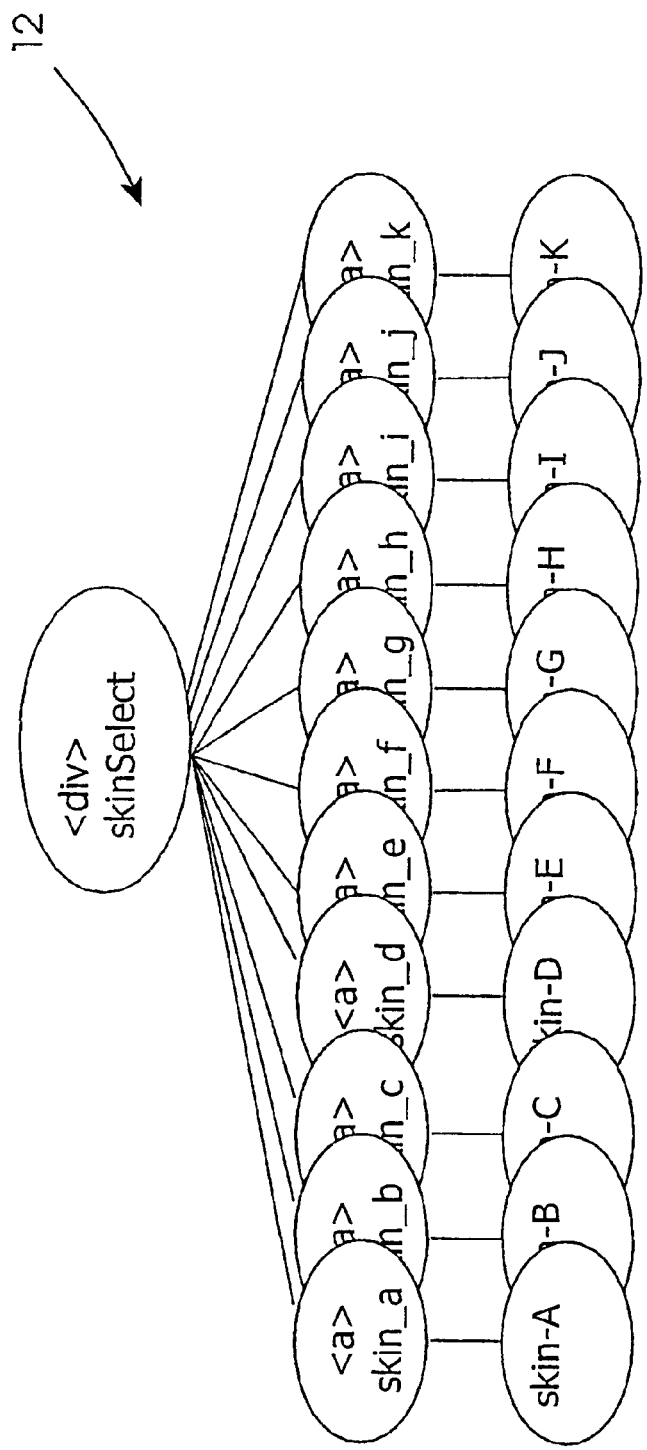
Figure 5:
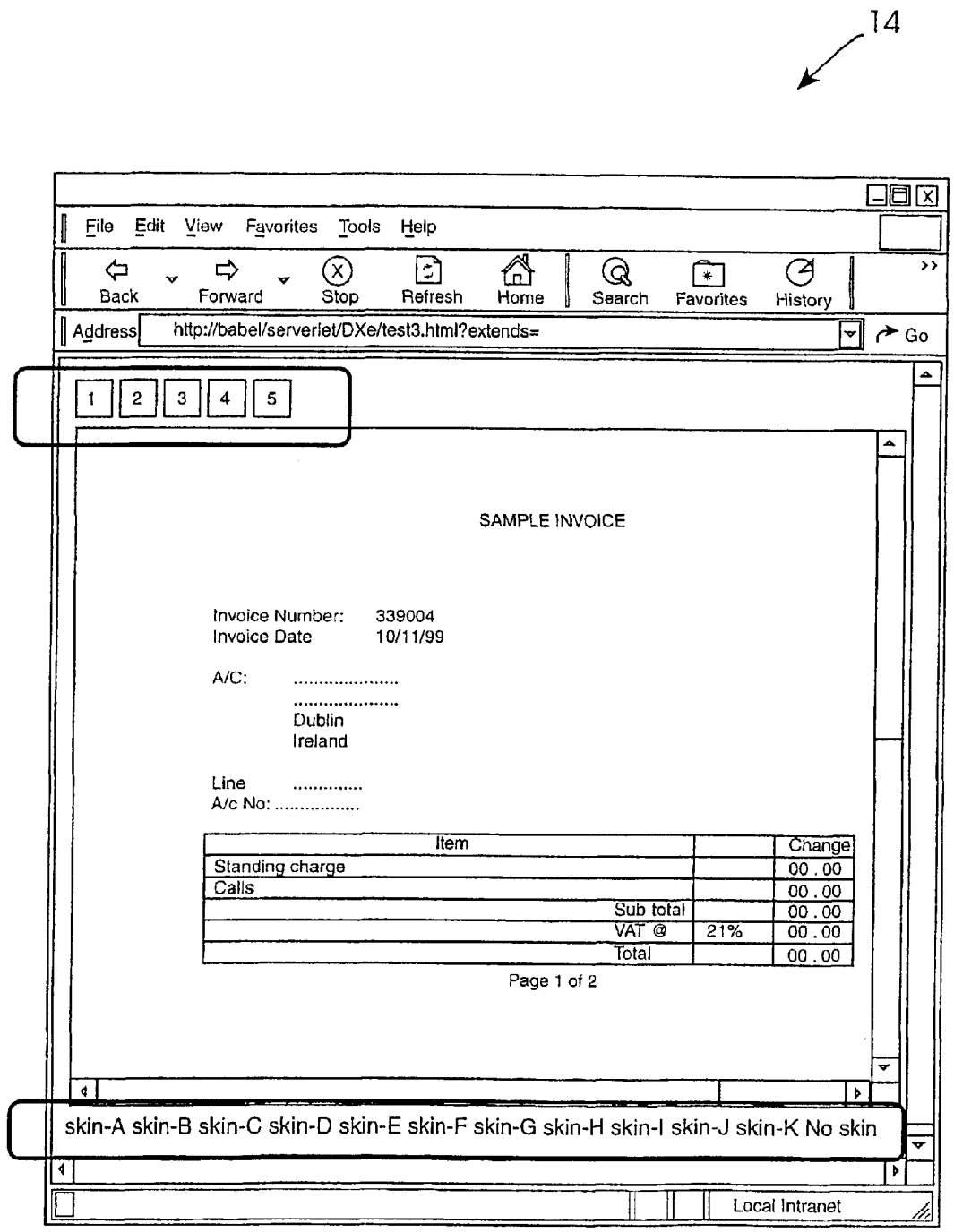
FIG. 5 is a screen shot of an intermediate target document as displayed by a browser.

The source document 4 (shown in FIG. 4(a)) is then parsed in step 11 to generate a tree 12, shown in FIG. 4(b). This is merged in step 13 with the first intermediate tree to provide a second intermediate tree 14. If the latter were to be rendered and displayed by a browser it would appear as shown in FIG. 5. This includes a top button bar provided by the content of the buttons.html source document 3, a main body provided by the content of the child.html source document 2, and skins (HTML links) provided by the content of the source document 4.

Figure 6B:
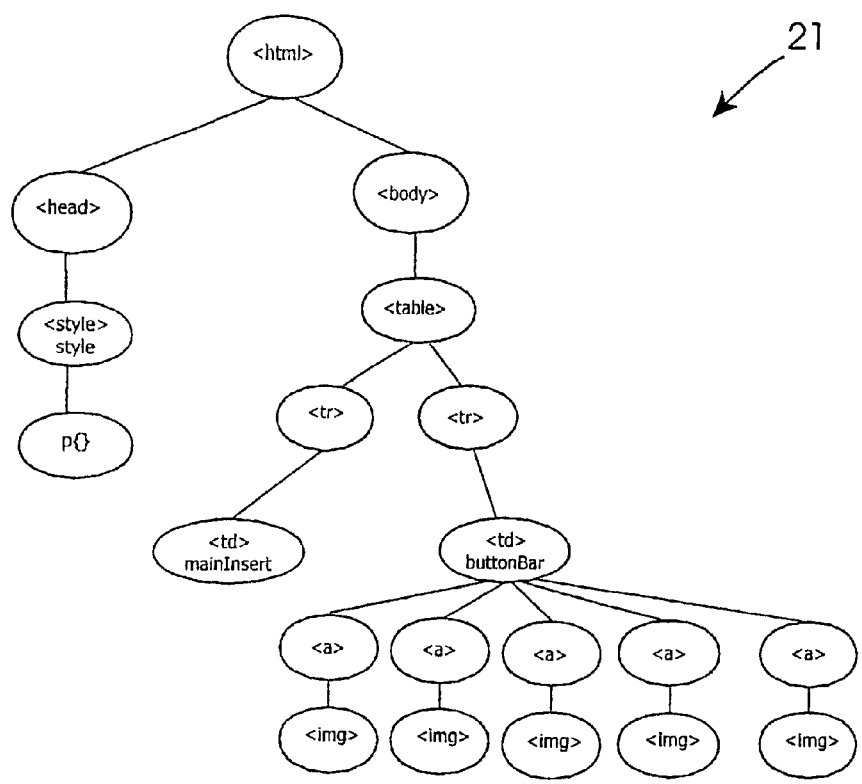
FIG. 6(b) is a tree representing the source document.

The source document 5 is shown in FIG. 6(a). This is parsed in step 20 to generate a tree 21 shown in FIG. 6(b).

Figure 6C:
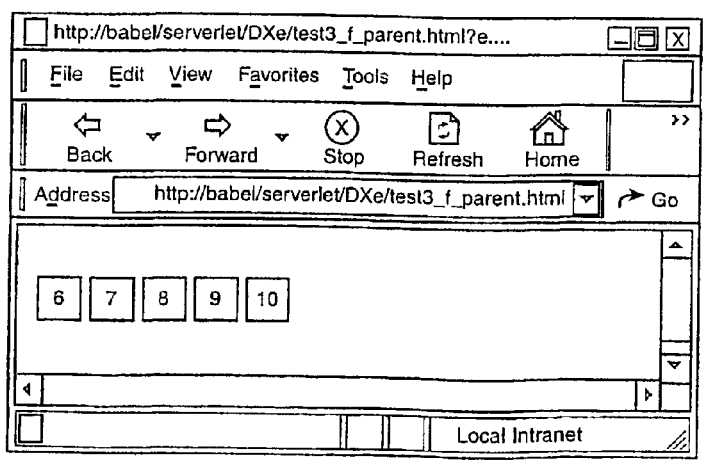
FIG. 6(c) is a screen shot of this source document as displayed by a browser.
Figure 7A:
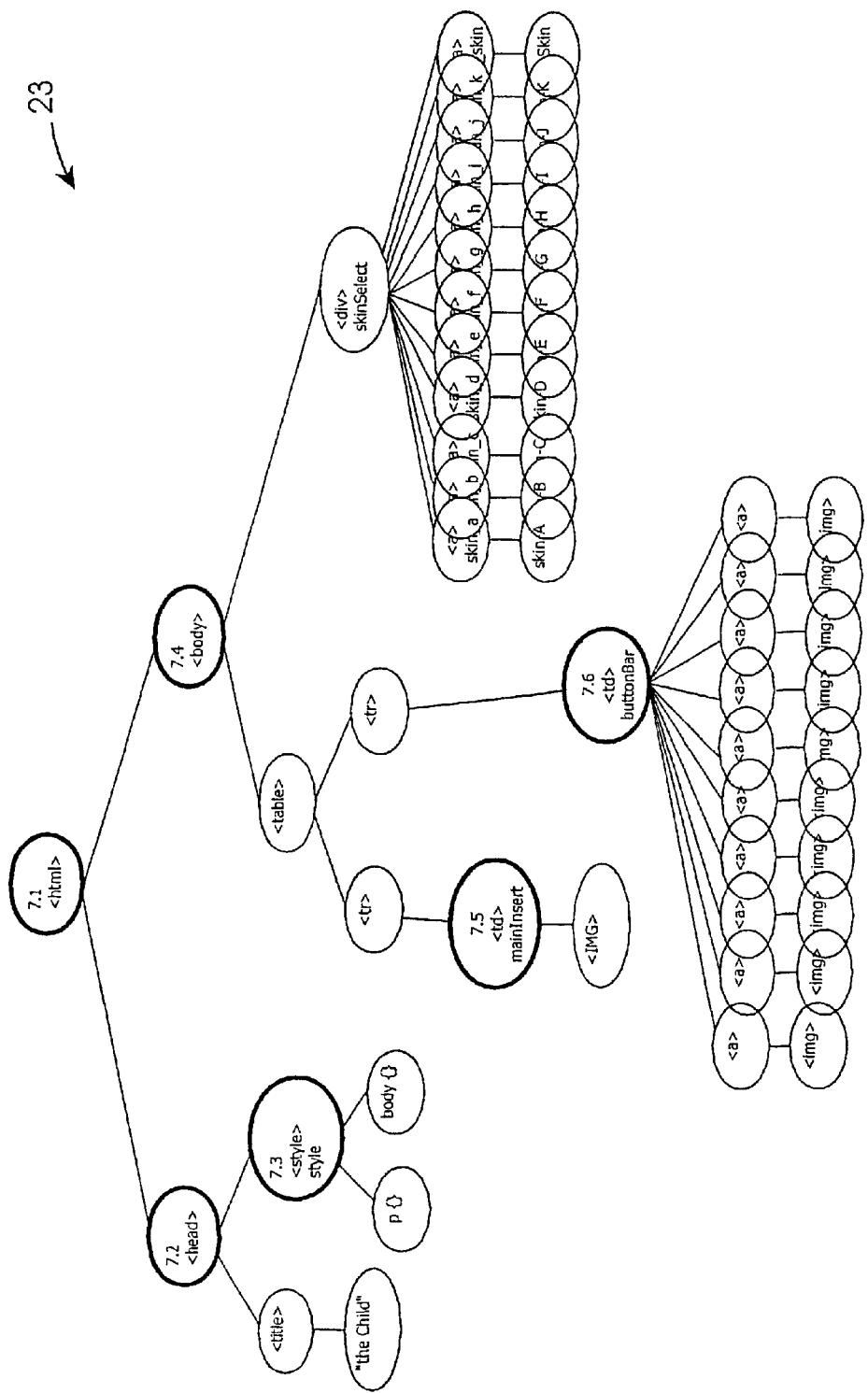
FIG. 7(a) is a tree of a target document, FIG. 7 (b) is the target document HTML.
Figure 7C:
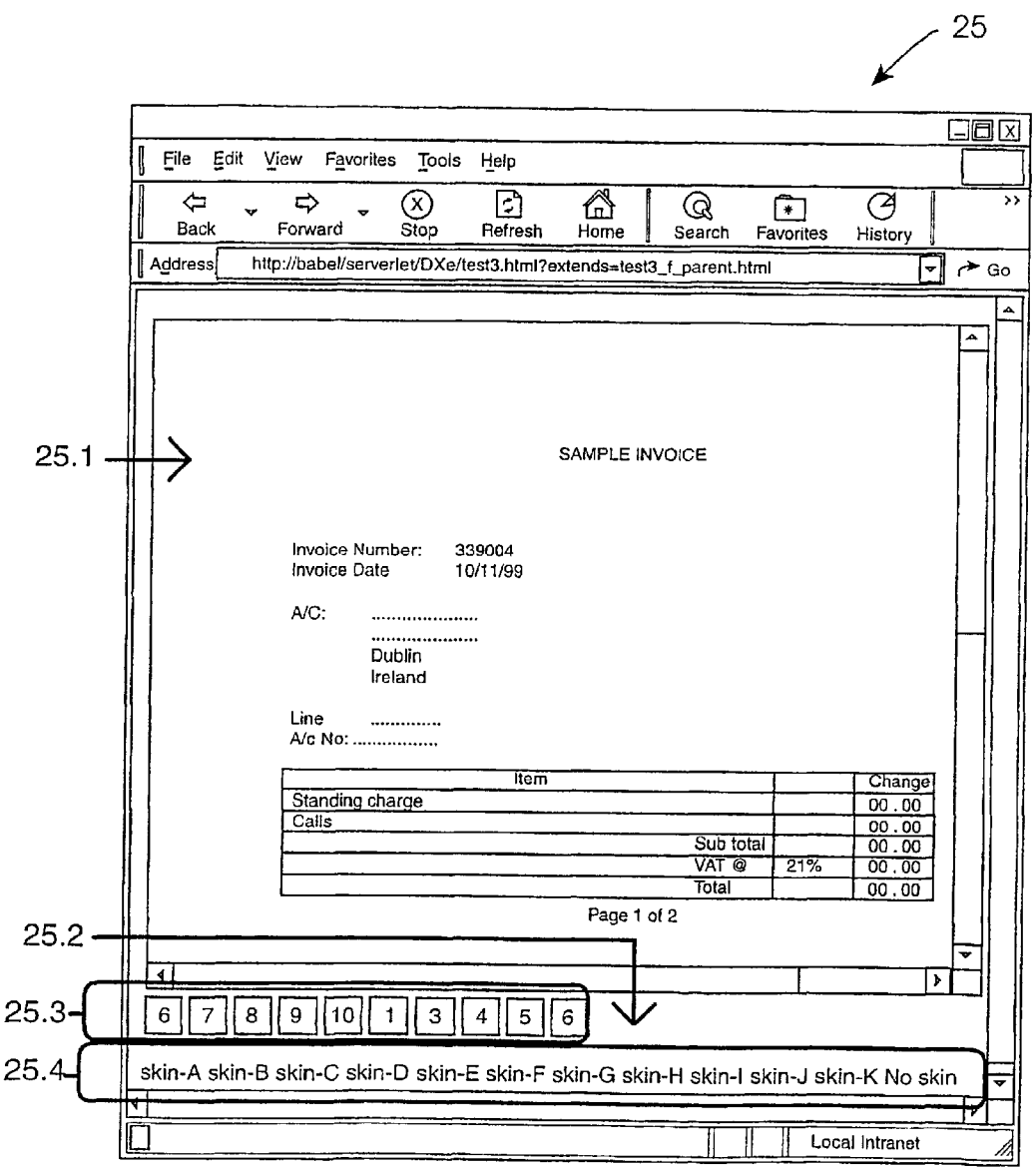
FIG. 7(c) is the target document as displayed by a browser.

The content of the source document 5 is shown in FIG. 6(c). In step 22 the tree 21 is merged with the intermediate tree 14 to provide a final target tree 23, shown in FIG. 7(a). This is rendered in step 24 to provide a final target document 25, shown in FIGS. 7(b) and 7(c).

Figure 8:
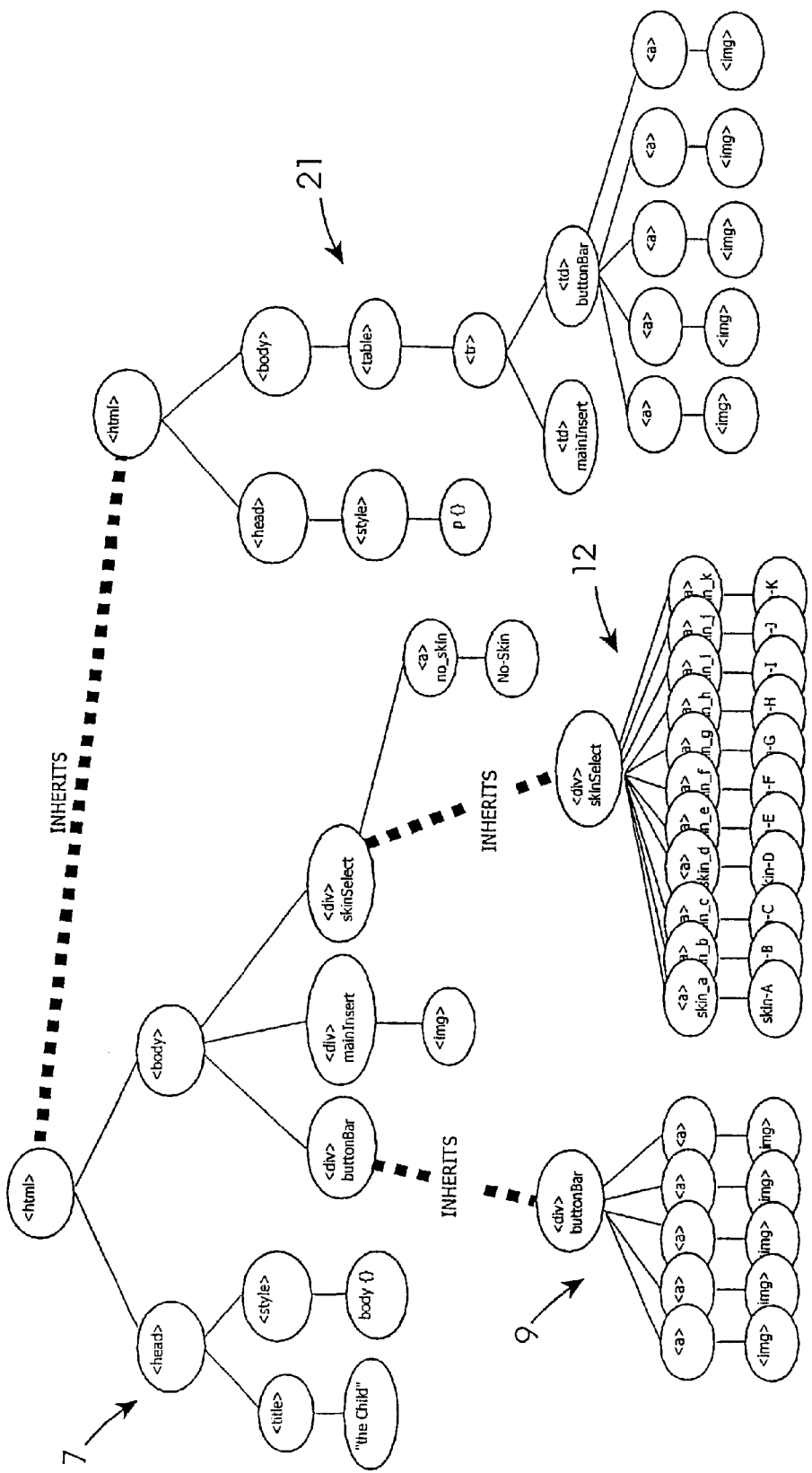
FIG. 8 is a diagram illustrating how the source trees of FIGS. 2 to 6 are merged to provide the target document tree.

As shown in FIG. 8, the final target document 25 is the result of the source document 2 inheriting from the other tree source documents 3, 4, and 5. In this document, the button bars of the documents 2 and 5 are combined in a single row 25.3 and are moved to below the main image 25.1. However, the hypertext links 25.2 and 25.4 remain at the bottom of the display. It will thus be appreciated that some of the content is re-ordered and some is not.

Referring again to FIG. 7(a) the merging steps have resulted in most nodes of the source documents 2, 3, 4, and 5 being present in the target document 25. However, each merge step identifies some nodes of the two source trees being merged as matching nodes and combines them to provide a composite node in the target tree. Composite nodes are indicated by heavy outlines in FIG. 7(a). These are the nodes called <html>, <head>, <style>, <body>, <td id="mainInsert">, and <td id="buttonBar">. The matching nodes of the source trees are identified as such because they have the same name. The name of the node is given by the id attribute. The composite node is given this (common) name and the aggregate attributes of the two matching nodes.

Also, in each merging step one of the source documents is assigned a "fixed role" and the other a "movable role". The tree structure of the fixed role tree does not change. However, the structure of the movable role tree can be changed within the framework of the fixed role tree. By default the inherited tree has the fixed role and the inheriting tree has the movable role.

The method 1 is implemented by a server, for example, by a Java Servlet. The target document 25 is transmitted by the server to the client. This is particularly useful because it delivers complete documents directly to the client. However, the method 1 may be implemented by a client system, or by an editing tool located at the server input. The editing tool processes pages in run time, and displays the target document for approval by the designer.

The following is a description of an implementation of this invention as an extension of a web server delivering HTML documents to standard web clients. This implementation takes the form of a Java Servlet running on a web server.

The source documents are defined using the XML syntax and so are simple to parse. A document is made up of elements, either compound or simple. A simple element takes the form of <tag attribute-list/> or a string of text.

A compound element is written as:

<tag attribute-list> (opening tag) other elements (children)

</tag> (closing tag)

A tag is a single word such as "html", "table" or "a". An attribute-list of named values separated by spaces. For example id="myTable" inheritTag="no".

The XML vocabulary support is very similar to xHTML, but adds the following:

An element <extend/> which indicates a placeholder, described below.

An attribute "id" is supported for all tags. This provides a name for the node.

An attribute "extends" is supported for all tags. This attribute indicates the documents from which this element is to inherit.

An attribute "nestable" is supported for all tags. This yes/no value indicates if the element is to be nested.

Overwrite_attribute=Yes/No. This attribute is supported for all tags and it indicates if the inherited attributes overwrite the inheriting attributes.

An attribute "inherit_tag" is supported for all tags. This yes/no value indicates whether the composite node is to be constructed favouring the node from the inheriting tree (false) or the inherited tree (true). The default is "true".

Relative references in html tags, such as href attributes in <a> tags, are translated to absolute references. This means that if a relative link is correct in its original file, it will be correct in any document that inherits it.

The syntax to disable resolving relative references to absolute ones is to precede the reference with "./" (a dot and a slash). This syntax is generally transparent (i.e. insignificant) to web browsers, but is significant to the merging software.

Inheritance Policy. Indicates the appropriate inheritance policy.

Each node of a tree contains the following:

Tag—a string

Id—stores the id of the node

Children—a list of child nodes

Parent—a link to its parent node

Text—a field used to store textual content of an element such as a comment or a piece of text from the html file.

The target document may be subjected to other translations before being delivered to the browser, such as XSLT translations or merging of data from databases. The target is converted into HTML by traversing the tree and generating appropriate HTML for each node. Traversal is recursive. The opening tag is generated for each element, then the branches of the tree commending at each child are traversed, and then the closing tag is generated.

Figure 9:
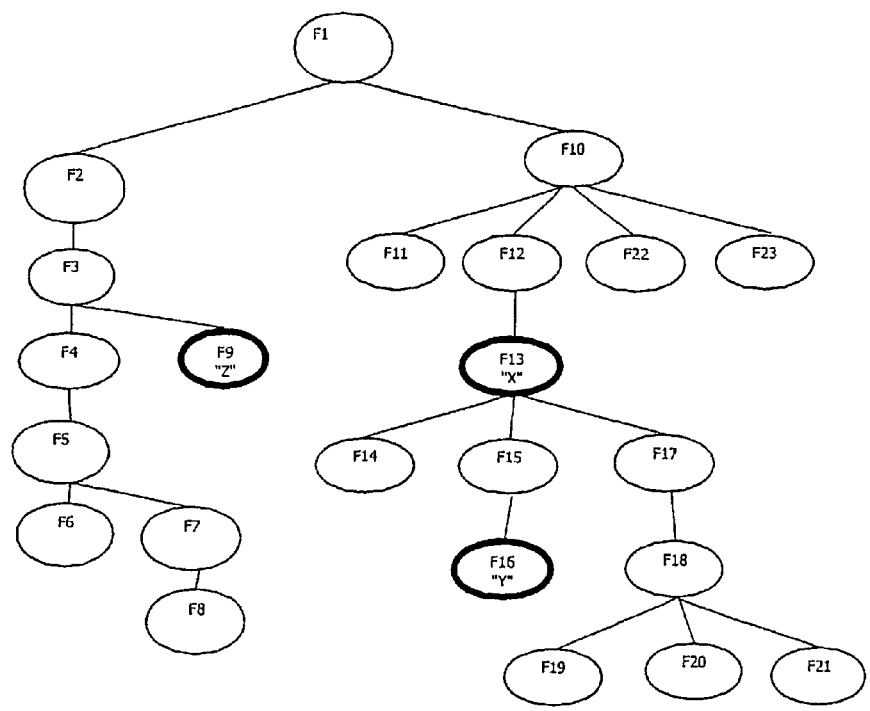
FIGS. 9 to 11 are diagrams of trees to illustrate merging operations.
Figure 10:
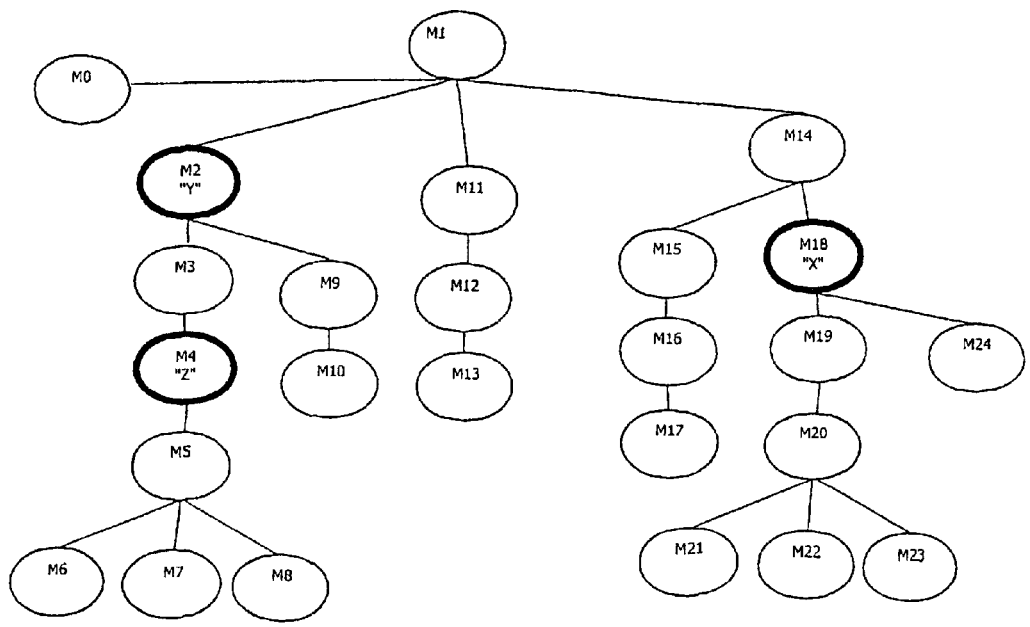
Figure 11:
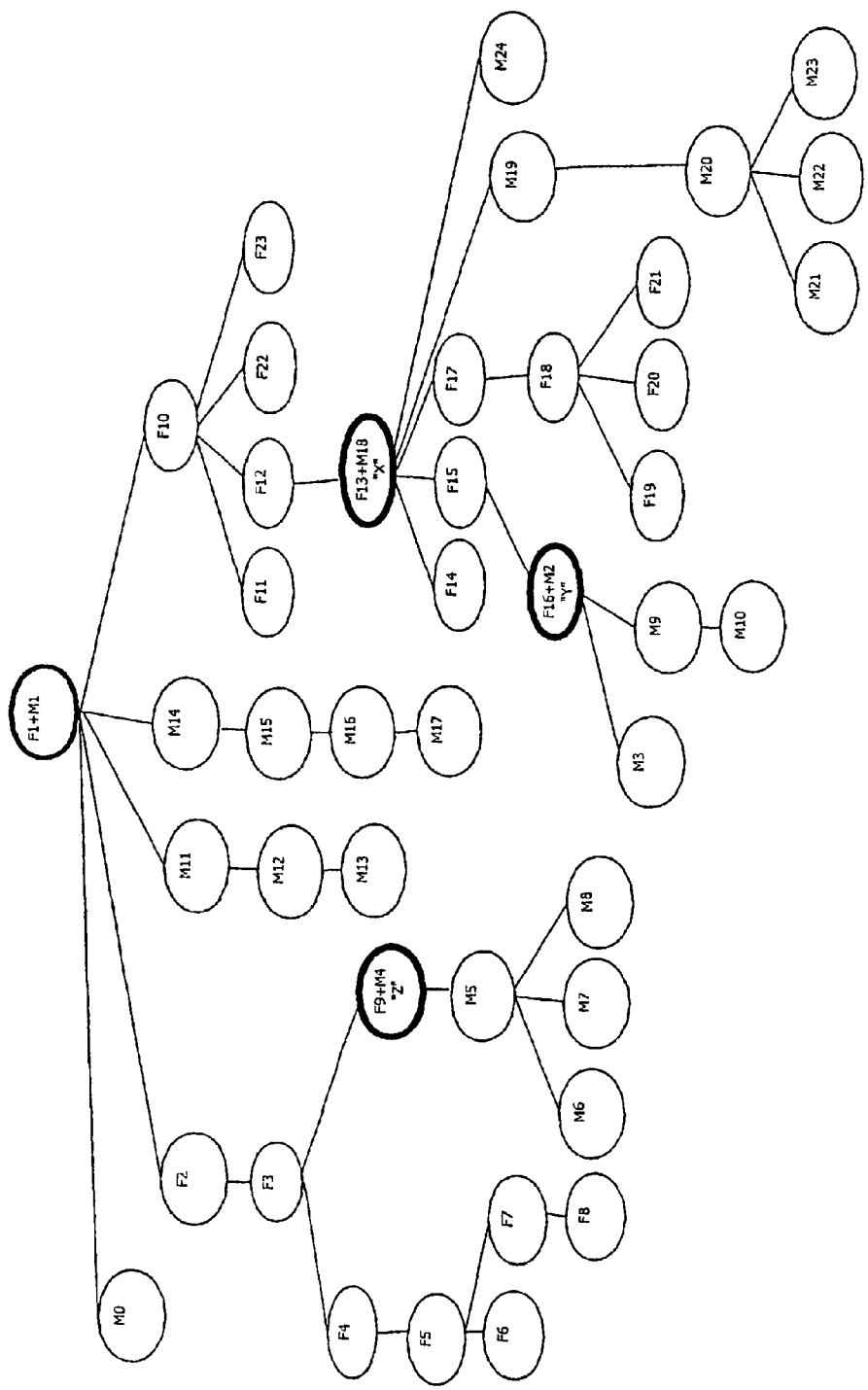

The merging operation is now described in more detail with reference to FIGS. 9, 10, and 11. FIG. 9 shows a source tree consisting of nodes named F1 to F23. Nodes F9, F13 and F16 are also identified by the letters "Z", "X" and "Y" respectively. FIG. 10 shows a source tree consisting of nodes M1 to M24. Nodes M2, M4 and M18 are also identified by the letters "Y", "Z" and "X" respectively. FIG. 11 shows a target tree resulting from merging the tree of FIG. 9 in a fixed role with the tree of FIG. 10 in a movable role.

The following is an explanation of how the location of each movable node M0 to M24 is determined for the target tree.

| | |
|---|---|
| M0 | M0 precedes M4. M4 is a descendent of F2, so M2 must precede F2 |
| M4 | Matches F9 |
| M5 | is a child of M4 |
| M6–M8 | are children of M5 |
| M11, M12, M13 | precede M18, and M18 is a descendent of F16 - so |
| M14–M17 | M11–17 must precede F16 |
| M2 | matches F16 |
| M3 | child of M2 |
| M9 | child of M2 |
| M10 | child of M9 |
| M19 | M19 is child of M18, M18 matches F13, so M19 is a child of the M18/F13 composite node and is placed after the children inherited from F13. |
| M20 | child of M19 |
| M21–23 | children of M20 |
| M24 | child of M18 |

The document merging method 1 permits source documents containing separate strands of content to be combined to generate a target document. The word "strand" means content which is associated, for example, an image and an associated text paragraph. The source documents and the target document may each observe different syntax rules. For example, the inheriting source document may contain xHTML, the inherited source document XML and the target document could be HTML. The process can be applied to files of any block-structured language and the resulting file can be translated into another language. There is thus excellent versatility for combining content.

The method is not symmetrical, i.e. a document A merged with a document B produces a different result from document B merged with document A. The merging step is achieved by logically adding nodes of the documents in the movable role into the structure of the document in the fixed role, at appropriate location. This process preserves the order of elements of the document in the fixed role but may not preserve the order of elements from the document in the movable role.

A document that inherits in the fixed role will retain its overall structure. Inheriting in the fixed role would be useful for example in the case of a HTML page which supports multiple languages. Such a page could inherit from a different parent depending on the language requested. Each language supported can be defined in a separate inherited document and merged in the movable role to generate a final document in the user's choice of language.

Regarding combining of matching nodes, the source tree root nodes are always considered to be matching nodes. Other matching nodes may be identified by a number of means. In this embodiment element identifiers (names) indicate nodes to be merged. Matching nodes may alternatively be identified as such by reference to grammar or structure rules stored externally to the document, or syntax within the documents. Another method for identifying matching nodes is to match on known elements in the structure of a document. For example a HTML document will always have a html element and usually have a head and a body element. It is known in advance that both documents being merged are html documents then the system can treat these nodes as matching nodes. Another method is based on paths to the nodes, possibly using a tool based on the XPATH W3C standard. There may also be multi-matching, in which one fixed tree node matches multiple movable tree nodes. This may be indicated by wild-card characters ("patterns"). An application of this mechanism is treating the result of a database query as a movable role tree.

The composite node is created from a mechanism appropriate to the nodes being processed. For example in HTML and XML a node comprises a tag and a list of named attributes or a string of text content.

For example:
<table id="myTable" border="2"> the word "table" is die tag and the attributes are "id" with a value of "myTable" and "border" with a value of "2".

The process of creating a composite node can favour either the node from the inheriting tree or the node from the inherited tree. One mechanism for merging HTML/XML tags is that the composite node takes the tag from the node of the inherited tree and adds the lists of attributes together. Where the node of the inherited tree and the node of the inheriting tree both have the same attributes, the value of the attribute from the inherited tree node is used. This mechanism is said to favour the inherited tree. An alternative mechanism favours the inheriting tree—i.e. it uses the attribute value from the inheriting tree and where both have the same attribute. Another mechanism is to use an attribute in one or other node to indicate which node is to be favoured. For example, and attribute inherit_tag="yes" indicates that the composite node is to be constructed by favouring the inherited document node. A refinement of this mechanism allows the system to favour the tag of the inherited node and the attributes of the inheriting node or vice-versa. This can be achieved using a second attribute, for example an "overwrite_attributes"="yes" or "no". This attribute value can indicate if tag attributes are to be overwritten with values from the inherited element. Alternatively, attribute values may be concatenated. The default behaviour is that a composite element inherits the tag of the inherited node, but does not overwrite the attributes of the inheriting node i.e. inherit_tag="yes", overwrite_attributes="no".

In the following description the term "fixed node" refers to a node from the tree that is in the fixed role for the merge operation. The term "movable node" refers to the node from the tree that is in the movable role. The term "fixed children" means the child nodes of the "fixed node". The term "movable children" means the child nodes of the "movable node". The following are the rules for the merge steps.

Trees are merged by identifying the matching nodes.

The root nodes of the two trees are always treated as matching nodes.

The root node of the target tree is a composite of the root nodes of the two source trees.

The order relationship of all nodes of the fixed tree is preserved.

A pair of matching nodes causes a single composite node to be added to the target tree in the location of the matching node from the fixed tree. The composite node may be constructed from information in the movable node, the fixed node, or both.

A matching node (and the sub-tree of which it is the root) from the movable tree is merged into the location of its matching node from the fixed tree.

If the fixed tree contains a placeholder node, then the movable children of that node are placed in the position of the placeholder. A placeholder node is described below.

A non-matching node from the movable tree is added to the target tree as a child of the node that represents its parent from the movable tree. If it is a child of the root node it is placed as a child of the root in the target tree. If its parent is a matching node, then it is placed after the child nodes from the matching node of the fixed tree, unless this order is modified by a placeholder node or another matching node.

Where a node has more than one ancestor that is a matching node, it is placed relative to the nearest matching ancestor in the target tree.

The order of non-matching nodes from the movable tree is preserved unless modified by the presence of a matching node or a placeholder.

Where there are no matching nodes or placeholders affecting the order of children, the list of children of a composite node will normally be the list of children from the fixed node and the list of children from the movable node concatenated so that the fixed children precede the movable children.

A "placeholder" node in the fixed tree is a dummy node which indicates that the nodes preceding it are to precede the nodes from the movable tree in the resulting list, whilst the nodes succeeding it are to succeed the nodes from the movable tree. Effectively, the children of the movable node replace the placeholder node. If a placeholder node has a name that matches one of its ancestor nodes (i.e. one of the nodes above it in the tree structure), then this indicates that the placeholder node is to be replaced by the children nodes of the named ancestors matching nodes of the movable tree. If the placeholder has no name, default behaviour may be defined. An example of possible default behaviour is to treat it as if it has the name of its immediate parent. In the preferred XML embodiment of this invention, the placeholder element is the "<extend/>" element.

A placeholder node may indicate which movable role document it relates to. This can be achieved by means of an additional control setting for the node. This can be an attribute of the XML tag, such as: <extend src="parent list">. The default behaviour in the absence of this attribute would be that the placeholder relates to all documents inherited in the movable role.

In some applications it may be more appropriate that elements are inherited only where they do not exist in the inheriting document, or that matching elements are completely replaced by the element from the inherited document rather than merged.

These alternative ways of performing inheritance are referred to as "inheritance policies". Eight inheritance policies are defined: prefer_inherited; prefer_inheriting; merge; merge_only; lookup_policy, prefer_fixed, prefer_movable, and ignore. The word "Prefer" indicates that when a matching node is encountered, a copy of the node (and sub-tree) only from the preferred tree is added to the target tree. "Merge" indicates that the nodes and sub-trees are to be merged as described above. The "merge_only" policy indicates that a node is inherited and merged only if it occurs in both the inherited and inheriting documents. In the lookup_policy the movable role tree is treated as a resource from which the fixed role tree picks matching nodes and merges these and their children into its structure. Elements which do no match are not merged.

Support for different merge policies is important because different types of content may require different handling. For example, executable script content should not be merged, whereas other HTML layout content may be merged.

The system makes no assumptions about the content of the documents being merged. For example: the file "buttons.html" shown in FIG. 3(a) produces a single tree (FIG. 3(b)). This is acceptable for the purposes of this invention. However, the buttons.html content is not a valid HTML file because it does not contain a topmost html element. If the syntax of the language of a document does not specifically define a single top-most element for a document then this invention may still be applied if a top-level element is synthesised in the parsing step.

As shown in FIG. 1, a document may inherit from a list of documents called its "inherit list". Inheritance is in the following order:

Recursively perform inheritance on each child of the current node as a separate tree.

If the current node inherits from other documents, inherit from each document in the inherit list in turn. This is achieved by creating a composite node from the current node and the root node of the document that it is inheriting from. The composite node becomes the root of the target tree. The sub-tree that starts at the current node and the tree represented by the document being inherited from are then merged using the indicated or default inheritance policy, to create the target tree. The target tree is then used as the document that inherits from the next inherited document in the list.

Because each child node is processed as a separate tree, its inheritance does not affect its siblings or other nodes in the tree. This is a recursive operation that builds the final document in a bottom-up order.

A document may include a number of separate trees (elements). This may be applied if one tree can be identified as the main tree in a document. The other trees (i.e. the ones that are not the main tree) can serve as trees for inheritance directly or indirectly, by elements within the main tree. This arrangement permits a single document to contain reusable elements within it.

The merge process may be enhanced by use of parameters. For example, attributes of the inheriting node may serve as parameters for inheritance. Using parameterised inheritance, each instance of inheritance of a document can result in a different target document. This is a particularly useful feature when combined with a script execution engine.

In some cases it will be more appropriate to nest compound elements rather than merging them. As an example, frameset elements in HTML should be nested beneath rather than merged into the inheriting element. Element nesting can be invoked by an appropriate syntax in the block-structured language. In HTML or XML this might be by means for the "nestable" attribute added to the open tag of an element. For example:

<frameset id="dxe_html_frameset" nestable="yes">

Such settings may be defined externally to the document.

Where an element indicates that it inherits from a list of other elements, the element is merged with the first element. The resulting tree is then merged with the second element listed, and so on until the list of elements is exhausted. Another embodiment of this invention could use a different sequence to implement "multiple inheritance". Each inherited document is inherited in a separate merge operation.

The inheritance operation is controlled by information that may be stored in the inherited and inheriting documents, or elsewhere. This control information is referred to as the "inheritance attributes" for an element. The inheritance attributes are stored in the documents where the language supports it. If the language cannot support these requirements then it is possible to store the necessary information in separate control documents, files of a database, or to use some static rules to specify and control the inheritance process.

The inherit list can be indicated by an attribute to the opening tag of an element such as:

<table extends="commonTable.html">

The value of the attribute can be static as described above, or, using an appropriate syntax, can be a formula, expression or script. For example, the following syntax might indicate that the attribute value is to be treated as a script:

<table extends="{isNetscape( )?'netscapeTable.html':'explorerTable.html'}">

The above script is given as an example of a script language statement only. It is intended to be interpreted as "if the browser is Netscape™ then inherit from the file netscapeTable.html otherwise inherit from the file explorerTable.html".

Multiple files to be specified as "inherited files" for the element. For example, a comma separated list:

<table extends="commonTable.html,mainTable.html">

The syntax also permits a document to specify whether inheritance is to be performed in the fixed role or in the movable role. This can be achieved by, for example, using a different attribute to indicate inheritance in each role: for example the "extends" attribute indicates inheritance in the movable role whereas the "use" attribute indicates inheritance in the fixed role. Alternatively there may be a syntax that indicates the role in which inheritance is to be performed. For example, enclosing a document name in parenthesis might indicate that the document is to be in the movable role in the inheritance.

There may be a mechanism for a document to indicate which role it is to fulfil in every inheritance. For example, a html document which is used to define the native language of a page may be most useful when it is inherited in the movable role. This can be indicated by means of an inherit_role="movable" attribute in the opening tag of the html element (the outermost element in a html document). Alternatively an element within the head element of the html document may indicate the same thing. Attempting to inherit such a file in the fixed role causes a warning.

The inherited file can be identified by a relative or absolute file name, or by means of any other naming convention, for example Internet URLs. The documents indicated in inherit list may be stored on the same computer or on a different computer, or may be retrieved from or delivered by some other type of device, for example, via HTTP.

An alternative method to indicate the inherited documents of a document is to use a link tag: for example:

<link href="parent url" type="text/html"/>

The inherited file does not necessarily have to be a complete document. Because inheritance operates on an element-by-element basis, it is possible to inherit from an individual element in a document, rather than from the complete document. This can be specified by a suitable syntax in the inherit list. In the case of a URL, a suitable syntax already exists—the anchor in a URL follows the file path and is separated from it by the hash character '#'. This is used to indicate the name of an element in a document. For example:

<table extends="commonTable.html#ctable">

It is envisaged that this functionality can be extended to allow for replication of elements to provide for merging of tabular information such as the results from database queries. It is also envisaged that use of a pattern matching mechanism as the anchor of an inherited document will provide additional functionality in this context. The commonly known Xpath language is suitable mechanism here because it is designed to describe elements in XML documents. Also, inheritance can be extended by employing patterns (wildcard characters) in a node identifier.

As with any URL, a document may reference itself by containing only an anchor, for example "#MYTABLE".

The following is an example where the information that controls inheritance (the inheritance attributes) is stored in separate elements.

```
<table>
    <nodeName>myTable</nodeName>
    <extends>commonTable.html</extends>
    <extends>mainTable.html</extends>
    <inheritance_policy>merge</inheritance_policy>
</table>
```

Alternatively, the same information may be expressed as attributes:

<table id="mytable" extends="commonTable.html, mainTable.html" merge_policy="merge">

The inheritance attributes used are shown in Table 1 below. Each of these attributes can be defined for every element:

TABLE 1

| Inheritance attributes | |
|---|---|
| Attribute name | Values |
| inherit_tag | yes or no |
| overwrite_attributes | yes or no |
| id | name for the element |
| extends | list of parents to inherit from |
| inherit_role | fixed or movable |
| inheritance_policy | policy name |
| nestable | yes or no |

Where pages are generated in response to queries, such as in an http server for the World Wide Web, information supplied in the query may be used to generate the inherit list. This can be achieved by providing, in the text of the query, the names of the inherited pages. Alternatively, part of the query could be used by a script or other programmed agent to determine the appropriate list by reference to other information available to it from an external source such as a configuration file, a database, or a session object i.e. an object containing information about the user and his/her activity.

Where a document has a known structure, then certain default behaviour may be built into the merging process. For example, HTML files have a structure consisting of an html element containing a head element and a body element. A possible shortcut rule would be to assume that the head elements are matching nodes and that the body elements are matching nodes whenever html documents are merged. This would remove the need for the html author to place matching id values in each of the elements.

The inheritance operation illustrated in FIGS. 2(a) to 7(c) avails of some additional matching information that is not explicit in the text of the documents. This information is based on the fact that html documents follow a known structure being that the topmost element is an html element and a html element contains a head and a body element. Because of this knowledge the merge procedure treats the html, head and body elements in the child and parent documents as matching nodes. If this knowledge was not available to the merge procedure then the same result could be achieved by putting matching "id" attributes in each tag—for example:

<html id="dxe_html">
<head id="dxe_html_head">
<body id="dxe_html_body">

As described above, the complete hierarchical structure of a document is parsed into a tree. In an alternative application only a portion of the document is parsed and lower levels of the hierarchy are ignored. Again using a HTML document as an example, the system might parse a html document to a maximum of three levels—i.e. to the level of individual tags within the head of body element—each element at that level being treated as a leaf of the structure tree.

Strands (associated content) defined in separate documents may contain links to other information. These links may be either absolute or relative links. Relative links use as a starting point, the location of the link. If the relative link is copied to a different location—such as happens when inheritance takes place, the relative link will be invalid. Therefore, the invention provides for mapping relative links to absolute links before they are inherited into a new document. A mechanism to disable this mapping is also provided for. Converting a link from a relative link to an absolute one is a simple operation. For example, if a file stored at location www.docland.com/index.html with the value "products.html". This results in the absolute url: www.docland.com/products.html.

It is envisaged that the present invention may include added functionality. It is envisaged that for example, content such as JavaScript elements could be pre-processed to locate errors and ensure function and variable names do not clash, and generally to implement more reliable support for the extended functionality provided by this invention. This would further reduce development time for Web sites.

It is envisaged that, by using the present invention, software reliability will be improved because the functionality of each strand can be tested discretely. Strands of content can be reused in many documents. Also, a strand once implemented may be re-designed to improve performance or functionality. Errors arising from dependencies between the various parts of a document can be minimised because these interdependent elements can be packaged together and inherited together.

It will be appreciated that, where the invention is implemented in a browser (client-side implementation), it can substantially reduce the communications bandwidth required to transmit pages from the server to the client. This benefit arises from the fact that inherited documents can be transferred from the server to the client once and cached on the client machine. The client can reuse this cached copy for each subsequent inheriting page. This benefit will be particularly useful for devices connected by low-bandwidth channels as mobile wireless devices.

A major advantage is that the invention provides a way meaningfully combined separate strands of information from different source documents can be used to produce a target document, thus supporting a "component" based system for generating documents.

The present invention is not limited to HTML but can be applied to a wide range of block-structured languages for example: WML, XML, XHTML, DHTML or other SGML derivatives. The present invention can also be applied to other block structured languages such as user interface resource files, the programming languages Pascal and C, and also to languages used to define 2 or 3 dimensional layouts and structures or integrated circuits. The invention also applies to languages and data structures used to store scientific, engineering or business information, games, cryptography and other areas of information technology. The present invention provides for a way to compress documents and collections of documents by eliminating duplication of content.

It will be further appreciated that when block structured language is discussed the presentation of information in these files encompasses all electronic information.

It will also be appreciated that the invention may be applied to documents without actually constructing a complete tree for both documents. An alternative embodiment of this invention may apply the same merging process without constructing a complete hierarchical representation of the documents.

It will be further appreciated that the representation of the hierarchical data structure for a document may be stored in a variety of ways such as in random access computer memory, in relational, object oriented, or hierarchical database management systems or in disk files.

The invention is not limited to the embodiments described but may be varied in construction and detail.

What is claimed is:

1. A document processing method comprising the steps of:
    (a) parsing syntax of a plurality of source documents to generate, for each source document, a hierarchical structure source tree of nodes including a root node and dependent nodes;
    (b) dynamically determining on a merge-by-merge basis which source tree is to be treated as having a fixed role for merging;
    (c) merging source trees to provide a target tree, said step of merging being done on a node-by-node basis and including,
        (c1) considering root nodes as matching root nodes and generating a single target tree root node corresponding to said matching root nodes from at least two matching root nodes according to criteria specified by attributes of the matching root nodes;
        (c2) identifying matching source nodes in the source trees, inserting a single node in the target tree corresponding to the matching source nodes, respectively, and inserting other nodes in the target tree with reference to said single node, said matching being determined independently of corresponding level within said hierarchical structure of said source trees of nodes;
        (c3) wherein, during merging, a structure of the source tree having the fixed role is preserved in the target tree, and a non-matching node from a source tree having a movable role is added to the target tree as a child of a node which represents its parent node from said movable role source tree, an order of non-matching nodes of the movable role source tree being preserved unless modified by the presence of a matching node, such that all descendents of a given movable role matching node will not necessarily be descendents of a given single node representing said given movable role matching node in the target tree; and
    (d) rendering the target tree to provide a target document.

2. The method as claimed in claim 1, further comprising before step (a) the step of determining a plurality of source documents to be parsed according to attributes associated with each respective source document that indicate on a node-by-node basis documents from which said respective source document should inherit, said attributes being stored internally within the source documents.

3. The method as claimed in claim 1, wherein said step of inserting a single node in step (c2) includes a first option of placing only one of a pair of matching nodes in the target tree, and a second option of combining the matching nodes to generate a composite node, a selection of option one or option two being made according to a policy.

4. The method as claimed in claim 3, wherein a default for said policy is said second option.

5. The method as claimed in claim 1, further comprising the step of placing said non-matching node after child nodes of a matching node in the fixed tree if the parent of said non-matching node is a matching node.

6. The method as claimed in claim 1, further comprising the step of handling a node having more than one ancestor matching node by placing it relative to a nearest ancestor matching node.

7. The method as claimed in claim 1, further comprising the step of recognizing a placeholder node in the fixed role tree and placing a set of nodes of the movable role source tree in the target tree in lieu of the placeholder node.

8. The method as claimed in claim 1, wherein said step of merging is activated in response to an inheriting source document indicating that it should inherit content from an inherited source document.

9. The method as claimed in claim 8, wherein said step of inheriting source document indicating that it should inherit content is accomplished by reading a flag indicating such.

10. The method as claimed in claim 9, wherein said flag is read from within the inheriting document.

11. The method as claimed in claim 9, further comprising the steps of recognizing a flag indicating required inheritance from a plurality of inherited documents, and merging the inheriting and the plurality of inherited documents.

12. The method as claimed in claim 11, further comprising successively merging pairs of documents in a nested manner until all source documents have been merged.

13. A document processing system comprising:
    (a) means for parsing syntax of a plurality of source documents to generate, for each source document, a hierarchical structure source tree of nodes including a root node and dependent nodes;
    (b) means for dynamically determining on a merge-by-merge basis which source tree is to be treated as having a fixed role for merging;
    (c) means for merging source trees to provide a target tree, said merging being done on a node-by-node basis;

(c1) wherein during merging the system considers root nodes as matching root nodes and generates a single target tree root node corresponding to said matching root nodes from at least two matching root nodes according to criteria specified by attributes of the matching root nodes;

(c2) wherein during merging the system identifies matching source nodes in the source trees, inserts a single node in the target tree corresponding to the matching source nodes, respectively, and inserts other nodes in the target tree with reference to said single node, said matching being determined independently of corresponding level within said hierarchical structure of said source trees of nodes;

(c3) wherein, during merging, a structure of the source tree having the fixed role is preserved in the target tree, and a non-matching node from a source tree having a movable role is added to the target tree as a child of a node which represents its parent node from said movable role source tree, an order of non-matching nodes of the movable role source tree being preserved unless modified by the presence of a matching node, such that all descendents of a given movable role matching node will not necessarily be descendents of a given single node representing said given movable role matching node in the target tree; and (d) means for rendering the target tree to provide a target document.

14. The system as claimed in claim 13, wherein choice of source documents to be parsed is determined according to attributes associated with each respective source document that indicate on a node-by-node basis documents from which said respective source document should inherit, said attributes being stored internally within the source documents.

15. The system as claimed in claim 13, comprising means for placing said non-matching node after child nodes of a matching node in the fixed tree if the parent of said non-matching node is a matching node.

16. The system as claimed in claim 13, comprising means for handling a node having more than one ancestor matching node by placing it relative to a nearest ancestor matching node.

17. The system as claimed in claim 13, comprising means for successively merging pairs of documents in a nested manner until all source documents have been merged.

* * * * *